United States Patent Office 3,514,165
Patented May 26, 1970

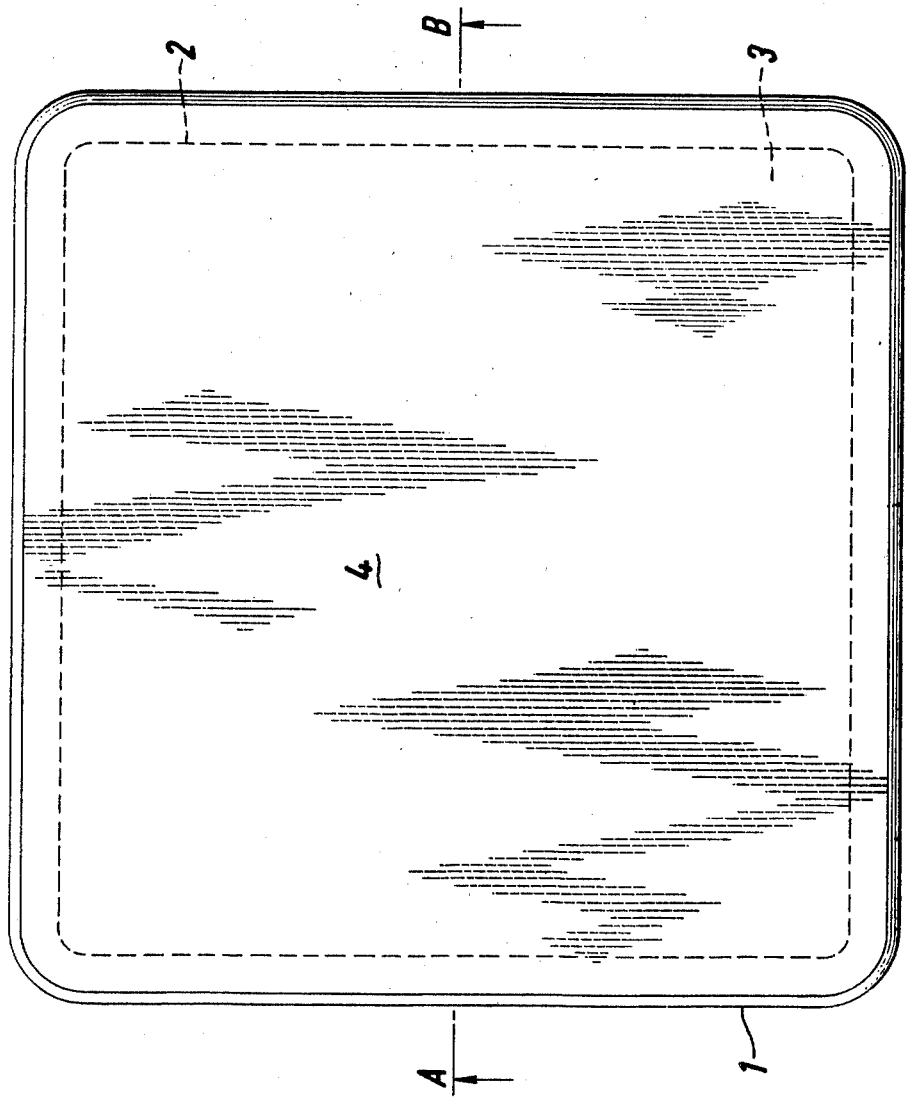

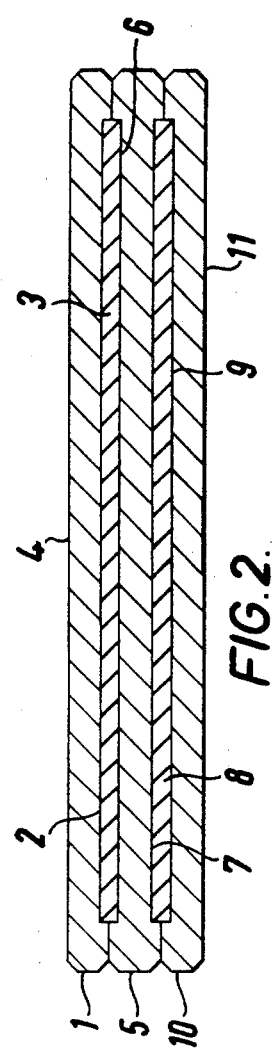
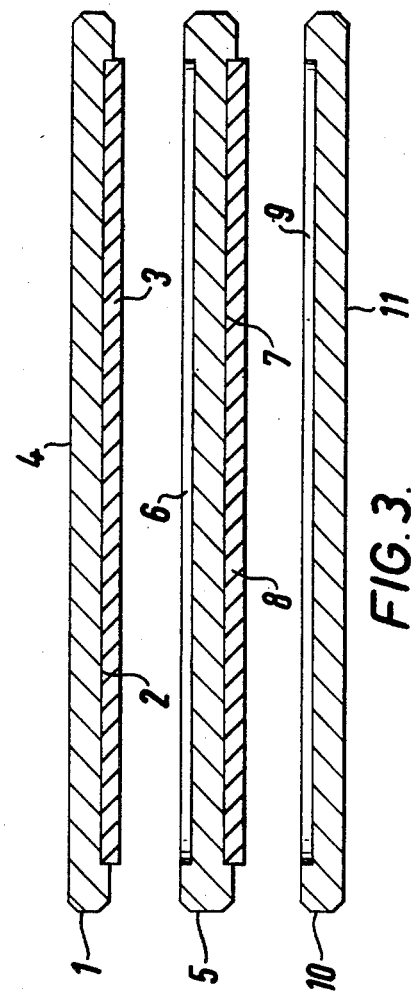

3,514,165
RESILIENT BEARINGS
Sydney William Marsh, New Malden, England, assignor to Solarbridge Engineering Limited, Glasgow, Scotland, a corporation of Scotland
Filed May 6, 1968, Ser. No. 726,819
Claims priority, application Great Britain, May 18, 1967, 23,218/67
Int. Cl. F16c *17/10*
U.S. Cl. 308—3     2 Claims

ABSTRACT OF THE DISCLOSURE

A resilient load supporting bearing comprising a plurality of separate, superposed slabs (1, 5, 10) of elastomeric material e.g. rubber, including a pair of terminal slabs (1, 10) and at least one intermediate slab (5), at least one of the terminal slabs (1) and each intermediate slab (5) having a reinforcing metal plate (3, 8) projecting from the slab to form a spigot arranged to engage in a recess (6, 9) in an adjacent slab, the slabs (1, 5, 10) being bonded together to form a unitary bearing assembly.

---

This invention relates to resilient load-supporting bearings such as bridge bearings of the kind comprising elastomeric material, such as rubber having reinforcing plates of metal e.g. steel incorporated therein and extending substantially parallel to the top and bottom surfaces of the bearing.

Such bearings may be formed as unitary structures wherein a single slab of elastomeric material such as rubber, has incorporated therein a stack of parallel, superposed, spaced reinforcing metal plates, or alternatively such bearings have heretofore been formed from a plurality of separate, superposed monoplate structures, each monoplate structure comprising a slab of elastomeric material reinforced with a metal plate embedded therein and bonded to the elastomeric material, the adjacent surfaces of any pair of structures forming the bearing having complementary-shaped spigots and recesses to allow the monoplate structures to be assembled in interlocked, superposed relationship to provide a bearing structure of any required height and any desired loading characteristics.

An object of the present invention is to form a unitary bearing from a plurality of separate monoplate structures.

Thus, according to one aspect of the present invention there is provided a resilient load-supporting bearing formed from a plurality of separate superposed slabs of elastomeric material including a pair of terminal slabs and at least one intermediate slab, at least one of said terminal slabs and the or each intermediate slab having a reinforcing metal plate embedded therein and bonded to the elastomeric material and extending substantially parallel to the outer surfaces of the terminal members, adjacent slabs having complementary-shaped spigots and recesses to allow the slabs to be assembled in superposed, interlocked relationship, and means for bonding together the superposed slabs to form a unitary bearing assembly.

A preferred embodiment of the invention will now be described by way of example only with particular reference to the accompanying drawing wherein:

FIG. 1 is a plan view of a unitary bearing assembly according to the invention;

FIG. 2 is a sectional view of the unitary bearing of FIG. 1 and

FIG. 3 is a sectional, exploded view of the bearing showing the individual monoplate structures thereof.

In the preferred embodiment of the invention illustrated in the drawings, only one of the two terminal slabs is provided with a reinforcing metal plate. The upper terminal slab 1 of the bearing is formed of elastomeric material such as natural or synthetic rubber and has bonded to the inner surface 2, thereof and embedded partly therewith a spigot 3 formed from a planar surfaced reinforcing metal plate of steel or other reinforcing material, extending throughout almost the whole length of the elastomeric slab 1 but not projecting beyond the periphery thereof, and lying substantially parallel with the outer surface 4 of the top terminal slab. Thus, the upper terminal slab 1 comprises a top outer surface of elastomeric material with the spigot of metal 3 projecting from the undersurface thereof.

A single intermediate slab 5 has a recess 6 formed in the surface of the elastomeric material intended to lie opposite the metal spigot 3 formed in the undersurface of the upper terminal slab 1, and the recess 6 is of a shape complementary to that of the spigot 3 such that when the upper terminal slab 1 and intermediate slab 5 are arranged in superposed relationship, the complementary-shaped spigot 3 and recess 6 allow the two slabs to interlock and effectively shield the metal plate or spigot 3 in the upper terminal slab 1 from any deleterious effects of the atmosphere or environment in which the bearing is to be used.

The intermediate slab 5 is formed on the surface 7 remote from the recessed surface thereof, with a spigot 8 similar to that provided in the upper terminal slab 1 and formed from a reinforcing plate preferably of steel. The spigot 8 on the intermediate slab is arranged to be located within a complementary-shaped recess 9 formed in the lower terminal slab 10 when the slabs 1, 5 and 10 are arranged in a stack in superposed relationship.

Preferably, no reinforcing metal plate is located within the lower terminal member 10, the bottom surface 11 of which is of planar form and the entire lower terminal member 10 is preferably formed from elastomeric material, recessed as previously described. However, it will be appreciated that the lower terminal slab 10 may be a monoplate structure also, or the upper terminal slab 1 may be formed of elastomeric material only and the lower terminal slab 10 formed of monoplate construction.

In accordance with the invention, the separate slabs 1, 5 and 10 of the bearing are united to form a unitary bearing by the application of cement or like bonding material to adjacent surfaces of the separate slabs thereby ensuring that the steel plates of the bearing are effectively sealed within the elastomeric material and protected from environmental effects.

It will be appreciated that the invention is susceptible of considerable modification and is not to be deemed limited to the particular constructional features described by way of example only. The slabs may be formed from any suitable elastomeric material reinforced with spigots formed from any suitable metal or alloy and although the slabs have been shown in FIG. 1 as of substantially rectangular form, it will be appreciated that the slabs and spigots may be of any suitable shape and construction and any number of intermediate slabs may be located between the upper and lower terminal slabs.

I claim:

1. A resilient load-supporting bearing formed from a plurality of separate superposed slabs of elastomeric material including a pair of terminal slabs and at least one intermediate slab, at least one of said terminal slabs and said at least one intermediate slab having a planar surfaced reinforcing metal plate embedded therein and bonded to the elastomeric material and extending substantially parallel to the outer surfaces of the terminal members, said reinforcing metal plates are partially embedded in the respective slabs of elastomeric material and project therefrom to form spigots, adjacent said slabs having recesses shaped complementary to said spigots to allow the slabs to be assembled in superposed, interlocked relationship, and means for bonding together the superposed slabs to form a unitary bearing assembly.

2. A resilient load-supporting bearing as claimed in claim 1 wherein the reinforcing metal plates terminate a short distance from the edges of the respective slabs thereby providing a seal of elastomeric material therefor.

References Cited
FOREIGN PATENTS 228,570  7/1963  Austria.
235,498  11/1959  Australia.
738,639  7/1966  Canada.

MARTIN P. SCHWADRON, Primary Examiner
L. L. JOHNSON, Assistant Examiner

U.S. Cl. X.R.
14—16; 308—26